United States Patent [19]

Wilcox

[11] 4,016,960
[45] Apr. 12, 1977

[54] DASHPOT WITH GUIDED PISTON

[75] Inventor: Lance C. Wilcox, Wilton, Conn.

[73] Assignee: Airpot Corporation, Norwalk, Conn.

[22] Filed: Jan. 2, 1976

[21] Appl. No.: 645,942

[52] U.S. Cl. .................................. 188/282; 16/66; 16/84; 91/422; 92/165 PR; 188/316; 188/322
[51] Int. Cl.² ........................................ F16F 9/02
[58] Field of Search .......... 188/281, 282, 297, 311, 188/316, 317, 322; 92/162 R, 165 PR; 16/66, 84; 91/422

[56] References Cited

UNITED STATES PATENTS

| 559,589 | 5/1896 | Miehle | 188/282 |
|---|---|---|---|
| 3,168,301 | 2/1965 | Allinquant | 188/316 X |
| 3,556,617 | 1/1971 | Axthammer et al. | 188/282 X |

FOREIGN PATENTS OR APPLICATIONS

| 1,405,761 | 9/1969 | Germany | 188/316 |
|---|---|---|---|
| 484,226 | 9/1953 | Italy | 188/316 |

Primary Examiner—George E. A. Halvosa

[57] ABSTRACT

The present dashpot utilizes a spaced pair of post guides secured to opposed piston sidewall segments to connect the piston to the inner sidewall surface of the cylinder. The guide pair essentially precludes motion of the piston within the cylinder along the first axis connecting the guides while limiting motion of the piston within the cylinder along a second axis transverse to the first axis and the cylinder axis in response to limited misalignment of the axis of the cylinder and the axis of the piston rod.

14 Claims, 9 Drawing Figures

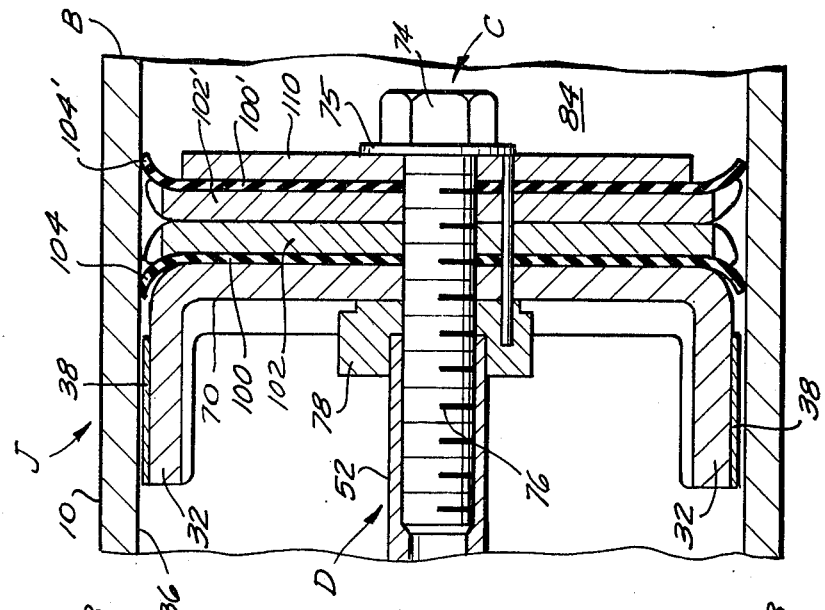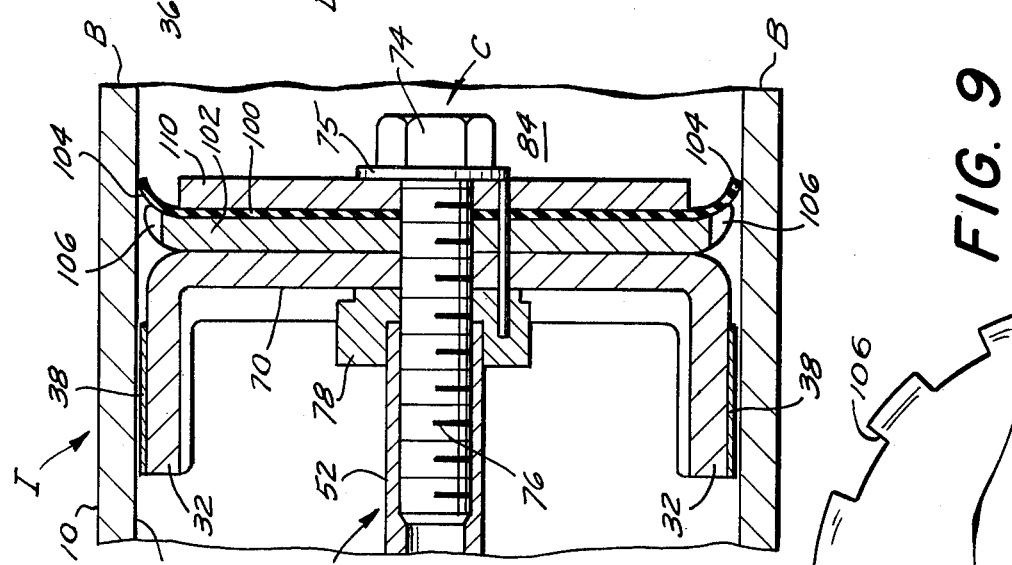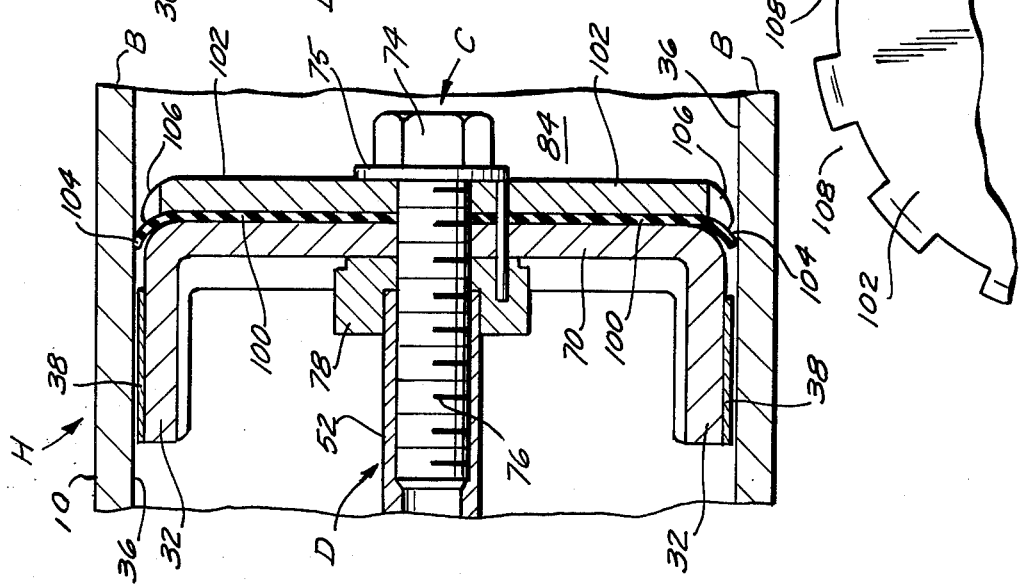

DASHPOT WITH GUIDED PISTON

BACKGROUND OF THE INVENTION

The present invention relates to dashpots and related dampening devices, and more particularly to such devices in which some forgiveness is provided for a limited misalignment between the axis of the reciprocating motion to be damped and the axis of the cylinder.

Damping dashpot and related piston-cylinder dampening assemblies comprise a hollow cylinder substantially closed at one end thereof, piston means disposed in and slidable along the cylinder, and a piston rod having a first end portion operatively connected to the piston means for moving the piston means back and forth along the cylinder axis and a second portion extending out of the open end of the cylinder and adapted for connection with a member undergoing reciprocating motion. The piston means in some instances comprises a piston having an outer sidewall snugly fitting within the cylinder inner sidewall so as to preclude the passage of fluid therebetween. The piston means in other instances comprises a piston having an outer sidewall inwardly spaced from the cylinder inner sidewall and fluid blocking means secured to the piston for movement therewith. The fluid blocking means includes a resiliently flexible portion disposed intermediate opposed sidewall portions of the piston and cylinder, respectively, and effective to block passage of fluid therebetween as long as the piston and cylinder axes are substantially parallel. In the latter instances the necessity of maintaining a fluid-tight seal between the piston means and the cylinder dictates that the piston outer sidewall be of sufficient length and in sufficient proximity to the cylinder inner sidewall to maintain the cylinder and piston axes substantially parallel.

Optimally the member to be damped undergoes reciprocating motion along an axis exactly aligned with the axis of the cylinder. However, in practice there is often a degree of misalignment between the reciprocating motion axis and the cylinder axis. To forgive such misalignment, assemblies have been provided in which the piston rod is capable of a degree of pivotal movement relative to the piston, this being accomplished conventionally by means of hinge or universal joint connections between the piston and piston rod, as disclosed in U.S. Pat. Nos. 3,175,646 (issued Mar. 30, 1965); 3,854,557 (issued Dec. 17, 1974); and U.S. patent application Ser. No. 498,585 (filed Aug. 19, 1974), now U.S. Pat. No. 3,939,947 (issued Feb. 24, 1976).

While it is generally recognized that the universal joint piston-piston rod connection represents an improvement over the prior art hinge type connection, it has not proven to be entirely satisfactory. The complex nature of such a connection not only increases both material and production costs, but simultaneously increases the possibility of defective products being produced. Furthermore, the trapping of the end segment of the piston rod within the piston severely limits the degree of free play which the piston rod is able to undergo relative to the piston.

Accordingly, it is an object of the present invention to provide a dashpot capable of forgiving limited misalignment of the axis of the cylinder and the axis of the reciprocating member using a rigid connection between the piston and piston rod.

It is a further object to provide such a dashpot without incurring the increased manufacturing cost and the limitations on free movement inherent in non-rigid piston-piston rod connections.

It is another object to provide such a dashpot which is of simple construction, easy to manufacture, and of suitable longevity.

SUMMARY OF THE INVENTION

It has now been found that the above and related objects of the present invention are attained in a dashpot comprising a hollow cylinder substantially closed at one end thereof, piston means, and a piston rod having a first end portion operatively connected to the piston means for moving the piston means and a second end portion adapted for connection with a member undergoing reciprocating motion along a path substantially, but not necessarily exactly, aligned with the axis of the cylinder. More particularly, the piston means comprises a piston disposed in and slidable along the cylinder, fluid blocking means secured to the piston for movement therewith, and at least one pair of guide means disposed on the piston for movement therewith. The piston has an outer sidewall spaced inwardly from the inner sidewall of the cylinder, and the fluid blocking means has a flexible portion thereof disposed intermediate opposed sidewall portions of the piston and the cylinder, respectively, and effective to block passage of fluid therebetween. The piston and the fluid blocking means as a unit by themselves are configured and dimensioned for pivotal movement within the cylinder about axes transverse to the cylinder axis.

Each guide means of the guide pair has an outer surface closely adjacent the cylinder inner sidewall, substantially circumferentially spaced from the outer surface of the other guide means of the guide pair, and configured and dimensioned to essentially preclude movement of the piston means within the cylinder along a first axis substantially connecting the guide means of the guide pair while only limiting to a predetermined level movement of the piston means within the cylinder about a second axis parallel to the first axis. The guide pair insures effective functioning of the fluid blocking means by essentially precluding motion of the piston means within the cylinder along the first axis while limiting to an acceptable level pivotal motion of the piston means within the cylinder about the second axis in response to limited misalignment of the axis of the cylinder and the axis of the piston rod.

Preferably there is only a single guide pair, the guide means of such guide pair being disposed in diametric opposition. The guide pair and at least a portion of the piston are preferably of one piece integral construction. Alternatively, each of the guide means may comprise an extension of a segment of the piston outer sidewall in the longitudinal direction and a thin strip of low friction or preferably self-lubricating material secured to the outer surface thereof to define the guide means outer surface. Preferably the guide means outer surfaces are configured and dimensioned to limit to less than about five degrees the movement about the second axis of the piston means within the cylinder.

Generally the dashpot also includes means for pivotally mounting the cylinder on a supporting structure to enable pivotal movement of the cylinder relative to the supporting structure about an axis transverse to the cylinder axis and the first axis, thus enabling the cylinder to track the motion of the piston.

In one embodiment the fluid blocking means comprises a resiliently flexible cup washer secured to the piston for movement therewith and having an edge disposed for a substantial length thereof intermediate opposed sidewall surfaces of the piston and the cylinder to block passage of fluid therebetween. The piston means additionally includes at least one passage extending therethrough and a flap valve controlling the passage of fluid through the piston means passage.

In another embodiment the fluid blocking means comprises a resiliently flexible cup washer secured to the piston for movement therewith and having an edge disposed for a slight length thereof intermediate the opposed sidewall surfaces of the piston and the cylinder. The cup washer edge is movable between first and second positions, the cup washer edge in the first position blocking the passage of fluid thereby intermediate the cylinder and piston, and in the second position permitting the passage of fluid thereby intermediate the cylinder and the piston. The cup washer edge assumes the first position upon movement of the piston in a first direction and assumes the second position upon movement of the piston in a second direction opposed to the first direction. Preferably at least one substantially rigid back-up member is secured to the piston for movement therewith and disposed adjacent the cup washer edge to limit movement of the cup washer edge from the first position to a position beyond the second position. The back-up member preferably defines a plurality of spaced fingers extending towards the cup washer edge but spaced from the cylinder inner sidewall.

Thus it is seen that, while in the prior art the misalignment between the reciprocating motion and the cylinder axis was forgiven by the connection between the piston and the piston rod, in the present invention the misalignment is forgiven by means of the movement of the piston within the cylinder. The present invention utilizes a piston which is shorter than a conventional piston for such a cylinder and thus itself incapable of maintaining the piston and cylinder axes parallel. On the other hand, the present invention introduces guide means which essentially preclude a deviation of the piston in one direction from the desired orientation and which limit the deviation in the transverse direction to a degree consistent with effective functioning of the fluid blocking means.

BRIEF DESCRIPTION OF THE DRAWING

FIG. 6 is a side elevation view, partially in cross-section, of a pull-type embodiment thereof using a flexible cup washer and a back-up member;

FIG. 7 is a side elevation view, partially in cross-section, of a push-type embodiment thereof using a flexible cup washer and a back-up member;

FIG. 8 is a side elevation view, partially in cross-section, of a two-way embodiment thereof utilizing a pair of flexible cup washers and a pair of back-up members; and FIG. 9 is a front elevation view of a back-up member useful in the present invention.

DETAILED DESCRIPTION OF THE PREFERRED EMBODIMENTS

Figure 1:
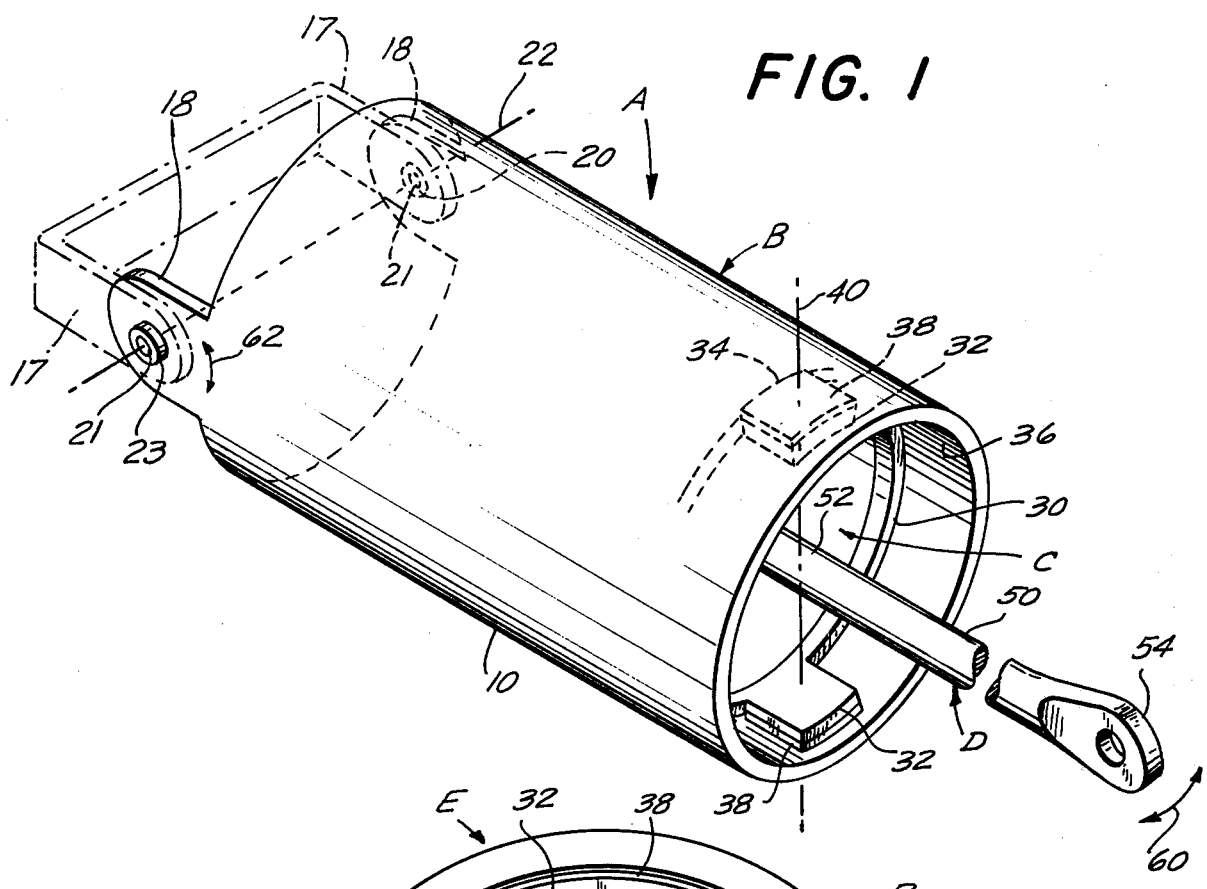
FIG. 1 is a fragmentary isometric view of a dashpot embodying the principles of the present invention.

Referring now to the drawing and in particular to FIG. 1 thereof, therein illustrated is a dashpot A comprising generally a cylinder B, piston means C and a piston rod D.

Figure 3:
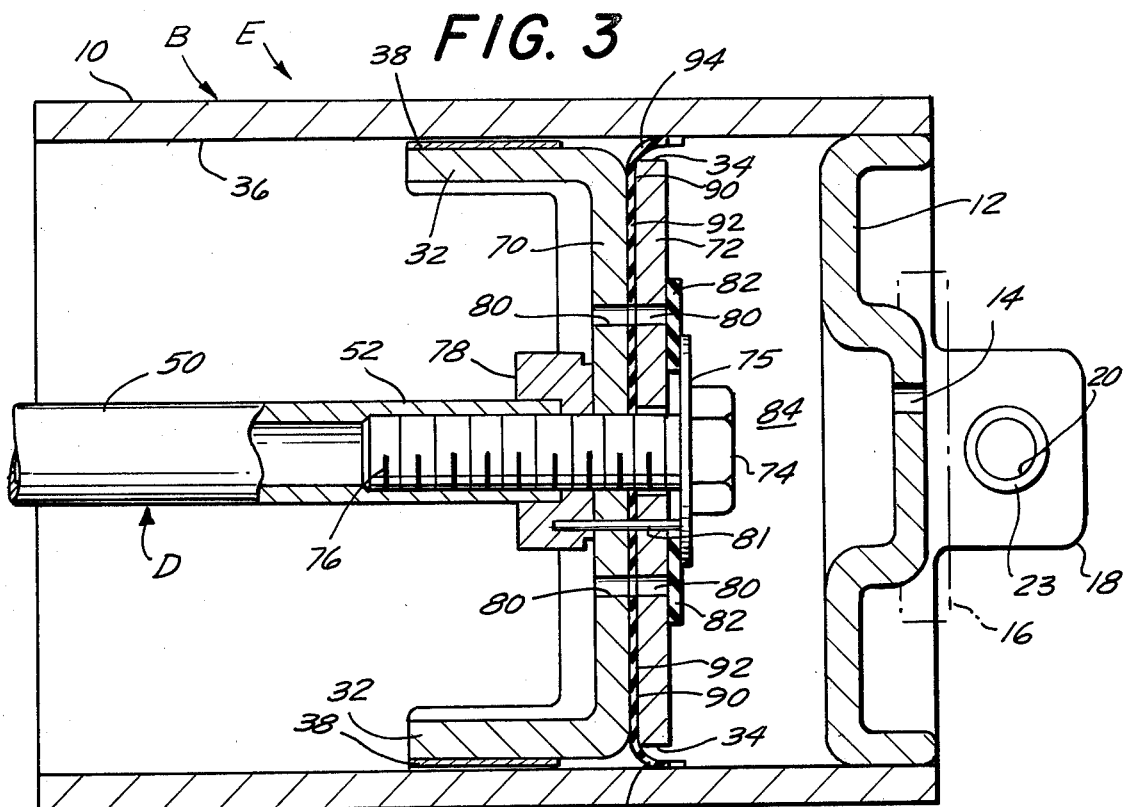
FIG. 3 is a side elevation view, partially in cross-section, of the embodiment of FIG. 2.

Referring now to FIG. 3, the hollow cylinder B is of conventional design and comprises a sidewall 10 substantially closed at the front thereof by a transversely extending end wall 12 containing a small aperture 14 therethrough. Means may be provided to vary the effective size of the aperture 14 to enable a variable check valve effect to be obtained, for example by rotatably fitting on end wall 12 a peripherally knurled molded plastic cap 16 (indicated in phantom line) having an aperture therethrough which is at least partially alignable or registerable with the end wall aperture 14. The degree of damping is thus adjustable by rotating the cap 16 to adjust the effective size of the end wall aperture 14 through variation of the relative degree of alignment and registration thereof with the cap aperture. Obviously a variety of other means well recognized in the dashpot art may alternatively be employed to obtain the variable check valve effect.

Referring now to FIG. 1, the cylinder B is adapted to be trunion mounted on a supporting surface containing a clevis 17 (illustrated in phantom line). Projecting forwardly from the cylinder end wall 12 adjacent the periphery thereof are a pair of diametrically opposed ears 18, each including an aperture 20 extending therethrough and adapted to be pivotally mounted on a pin or trunion 21 secured to clevis 17 and extending along axis 22 transverse to and passing through axis of the cylinder B. A bushing 23 is preferably fitted in each aperture 20 to facilitate rotation of the ears 18 about pin 21.

The piston means C disposed within the dashpot cylinder B comprises a generally cylindrical piston 30 disposed in and slidable along the cylinder B, at least one pair of rearwardly-extending guide means 32 disposed on the periphery of the rear wall of the piston 30 for movement therewith, and fluid blocking means (not shown in FIG. 1) secured to the piston 30 for movement therewith. As in conventional dashpot pistons, the piston 30 has an outer sidewall 34 spaced inwardly from the inner sidewall surface 36 of the cylinder B. However, the piston 30 is substantially shorter than would be a conventional piston for a cylinder B of given diameter, as will be described in further detail hereinafter.

Each of the rearwardly-extending guide means 32 has an outer surface 38 substantially circumferentially spaced from the outer surface 38 of the other guide means 32 of the guide pair in question and closely adjacent to the cylinder inner sidewall 36. The piston means C preferably includes only a single pair of guide means 32, the guide means 32 being diametrically opposed to one another so that motion of the piston means C in either direction along an axis 40 substantially connecting the guide means 32 and perpendicular to the cylinder axis is essentially precluded by the abutment of the guide outer surfaces 38 against the cylinder inner surface 36. On the other hand, because the cylinder is trunion mounted and capable of pivoting about axis 22, any force tending to cause movement of the guide means 32 in either direction along the axis 40 is transmitted to the cylinder B and results in a pivoting of the entire dashpot A about the axis 22.

It will be noted that when the piston means C is prefectly centered within the cylinder B the guide means outer surfaces 38 are not actually in contact with the cylinder inner sidewall 36, but only closely adjacent thereto. In actual use, however, the loosely fitting piston 30 is rarely perfectly centered within its cylinder, and, as practical matter, one of the outer surfaces 38 tends to be in contact with the cylinder inner sidewall 36 while the other outer surface 38 is spaced therefrom. In any case, the two guide means outer surfaces 38 are so closely proximate to the cylinder inner sidewall 36 as to essentially preclude movement of the piston means C within the cylinder B along the axis 40 substantially connecting the guide means 32 and perpendicular to the cylinder axis. On the other hand, the guide means 32 are so configured and dimensioned as to only limit to a predetermined level possible movement of the piston means C within the cylinder B about a second axis parallel to axis 40.

The predetermined level of movement of piston means C about the second axis is determined by various factors including not only the spacing of the guide means outer surfaces 38 from the cylinder inner sidewall 36, but also the length of the outer surfaces 38 (that is, their length parallel to the cylinder axis), the width of the outer surfaces 38 (that is, their circumferential extension) and their degree of curvature relative to the curvature of the cylinder inner sidewall 36. Increasing the length or width of the outer surfaces 38 or decreasing the degree of curvature thereof acts to further limit such movement about the second axis without in any way affecting the preclusion of movement of the piston means C along the first axis 40. The degree of movement of the piston means C about the second axis may also be further limited by decreasing the spacing between the outer surfaces 38 and the cylinder inner sidewall 36, but this technique for further limiting the movement of the piston means C about the second axis may result in an undesirable binding of the piston means C within the cylinder B. Preferably the curvature of the outer surfaces 38 corresponds substantially to the curvature of the cylinder inner sidewall 36; therefore the variables to be concentrated upon in configuring and dimensioning the outer surfaces 38 to effect the desired predetermined limitation of movement about the second axis are the length and width of the outer surfaces 38. It is therefore a simple matter of routine experimentation to determine the optimum length and width for the outer surfaces 38 to achieve any desired limitation of movement about the second axis. By way of example it is noted that for a cylinder having a 53mm inner diameter and a piston having a 9mm length, a preferred guide means has a length of 10mm and a circumferential width of 20mm. Clearly outer surfaces 38 of other than rectangular peripheral configuration may also be used—for example, a semi-circular peripheral configuration.

Preferably each guide means 32 comprises a rearward extension of the piston outer sidewall in a longitudinal direction (that is, parallel to the cylinder axis) and a thin strip of low friction material secured to the outer surface of the extension to define the guide means outer surface 38. Especially suited for use as the low friction material is a self-lubricating poly-tetra-fluoroethylene material available under the trademark RULON from the Dixon Corp. of Bristol, R.I. Alatenatively, both the pair of guide means 32 (including outer surfaces 38) and at least a portion of the piston 30 may be of one-piece integral construction.

The piston rod D is conventional in design and comprises a hollow rod 50 having an internally threaded end portion 52 operatively connected to the rear wall of piston 30 for moving the piston 30 (and hence the piston means C) and an apertured end portion 54 adapted for connection with a member (not shown) undergoing a reciprocating motion along a path substantially, but not necessarily exactly, in line with the axis of the Cylinder B.

It will be noted that axis 40 connecting the pair of guide means 32 is perpendicular to the axis 22 through ear apertures 20 as well as perpendicular to the cylinder axis. Thus if the member to be dampened is undergoing a reciprocating motion including components in the direction of double-headed arrow 60 of FIG. 1, the guide means 32 permits a responsive limited reorientation of the piston means C within the cylinder B; if the reciprocating motion includes components in the direction of double-headed arrow 62 of FIG. 1, the guide means 32 cause the entire dashpot A to undergo a responsive compensating pivotal motion about axis 22 which maintains the dashpot A aligned with the reciprocating motion.

The description of the invention in connection with FIG. 1 has thus far been of general applicability to all of the various embodiments thereof, and thus necessarily vague insofar as the detailed construction of the piston 30 and the fluid blocking means is concerned. Thus we now turn our attention to the specific embodiments, with emphasis upon the piston 30 and fluid blocking means associated with each embodiment.

Figure 2:
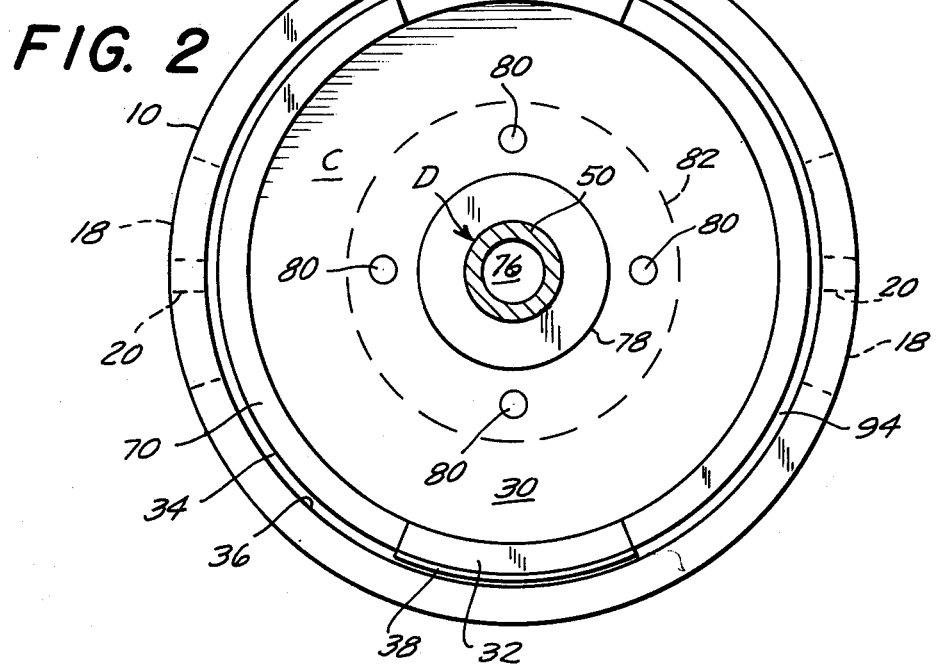
FIG. 2 is a front elevation view, partially in cross-section, of a push-type flap valve embodiment thereof.

Referring now to FIGS. 2 and 3 in particular, therein illustrated is a push-type flap valve dashpot E. In this embodiment, the piston 30 comprises a thin cylindrical member 70 connecting the guide means 32 and a disc 72 extending parallel to but spaced from the member 70, the disc 72 and the member 70 securing therebetween a portion of the fluid blocking means. A bolt 74 passes through aligned central apertures of the member 70 and disc 72 and comprises a radially flanged head 75 and an externally threaded end 76 received within and meshing engaging for movement therewith the internally threaded end 52 of the piston rod D. A collar 78 abuts member 70 and is disposed about both rod end 52 and bolt end 76 to assist in maintaining alignment between the ends 52 and 76 in order to relieve non-longitudinal stress on the threads thereof.

Four equidistantly circumferentially spaced apertures 80 extend through the member 70 and the disc 72. An aligning pin 82 passes through aligned apertures in disc 72 and member 70 and is maintained in position by collar 78 and the flange of bolt head 75 to insure that the apertures 80 of the disc 72 and member 70 are maintained in alignment. A flap valve 82, such as a flexible rubber washer, is secured intermediate the radial flange of bolt head 75 and the adjacent front surface of disc 72, the edge of the flap valve 82 extending over and beyond the apertures 80. Thus during the push stroke of the piston rod D the development of pressure in the chamber 84 intermediate the piston means C and the cylinder front wall 12 forces the flap valve 82 to lie flat against the forward surface of disc 72, thus blocking fluid passage through apertures 80. On the reverse or pull stroke of the piston rod D, the development of vacuum in chamber 84 causes the ends of the flap valve 82 to lift from the forward surface of disc 72, thus enabling fluid passage through apertures 80 to relieve the developing vacuum.

The fluid blocking means comprises a thin cup washer 90 having its central portion 92 secured intermediate member 70 and disc 72 for movement with the piston 30. Cup washer 90 contains a central aperture to permit passage of bolt 74 therethrough and additional apertures about the central aperture and aligned with apertures 80 to permit passage of fluid through the additional apertures. The resiliently flexible peripheral or edge portion 94 of cup washer 90 extends forwardly, is at least partially disposed intermediate the outer piston sidewall 34 (of disc 72) and the cylinder inner sidewall 36 for a substantial length thereof, and is effective to block passage of fluid therebetween. The edge 94 is preferably sufficiently resilient that, in the absence of the cylinder B, it would extend radially outwardly of the guide means outer surfaces 38.

It will be noted that the piston 30 and the fluid blocking means 90, taken as a unit by themselves, are configured and dimensioned to enable pivotal movement, and indeed rotation, of the unit within the cylinder B about axes transverse to the cylinder axis—for example, about an axis parallel to either axis 22 or axis 40. However, clearly gross pivotal movement of the unit about such axes would break the fluid-tight seal effected between the cup washer edge 94 and the cylinder inner wall 36, thus permitting the passage of fluid therebetween and interfering with the operation of the dashpot. The guide means 32, however, insure effective operation of the fluid blocking means 92. By essentially precluding any movement of the guide means 32 along the axis 40, the guide means 32 effectively preclude any rotation of the piston means C about an axis parallel to axis 22. By limiting the rotation of the piston means C about an axis parallel to axis 40, the guide means 32 limit such pivotal movement or rocking of the piston means C to a level which can be compensated for by the flexibility of the cup washer edge 94. The cup washer may conveniently be formed of the same self-lubricating poly-tetrafluoroethylene material used for outer surfaces 38, in which case the outer surfaces 38 are preferably configured and dimensioned to limit to less than about five degrees the possible pivotal movement of the piston means C within the cylinder B about an axis parallel to axis 40.

Figure 4:
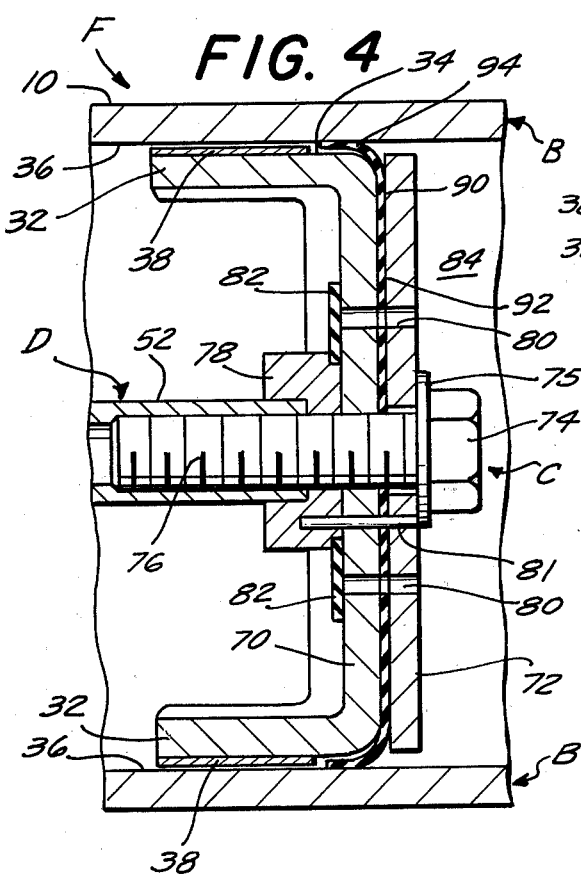
FIG. 4 is a side elevation view, partially in cross-section, of a pull-type flap valve embodiment thereof.

Referring now to FIG. 4 in particular, therein illustrated is a pull-type flap valve dashpot F which is essentially identical in construction to the push-type flap valve dashpot A of FIGS. 2 and 3 except that the flap valve 82 (instead of being secured between the flange of bolt head 75 and the forward surface of disc 72) is secured between the rear surface of member 70 and wings provided on collar 78 for this purpose and the cup washer 90 is inverted with its edge 94 now extending forwardly intermediate the piston sidewall 34 (of member 70) and the cylinder inner sidewall 36. As the radial flange of the bolt head 75 is no longer required to maintain the flap valve 82 in position, it may be reduced in width to a diameter sufficient only to prevent accidental dislodging of aligning pin 81.

Figure 5:
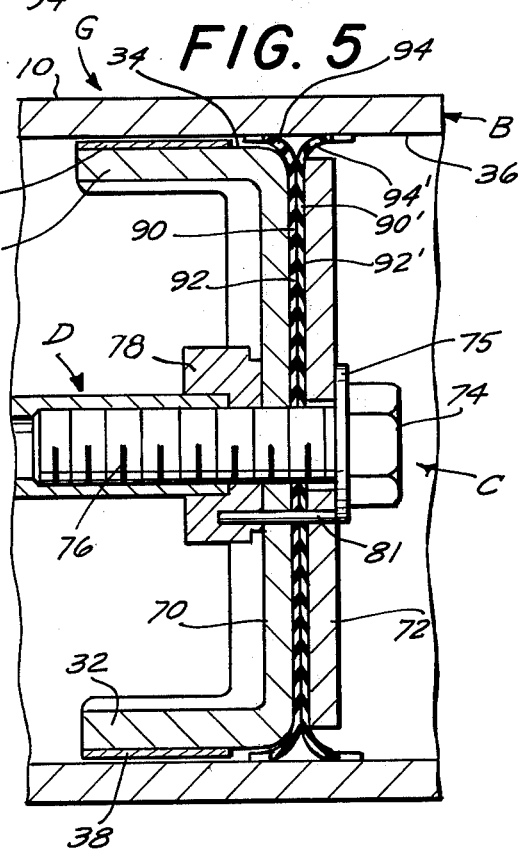
FIG. 5 is a side elevation view, partially in cross-section, of a two-way embodiment thereof.

Referring now to FIG. 5, therein illustrated is a two-way or push-pull dashpot G. The piston means C of dashpot G is similar to the piston means of dashpots E and F of FIGS. 2–4 except for the absence of flap valve 82 and apertures 80 (and the corresponding apertures of the fluid blocking means) and the presence of two cup washers 90, 90' disposed in back-to-back relationship. The cup washer central portions 92, 92' are secured intermediate the front surface of member 70 and the rear surface of disc 72, the edge 94 of washer 90 being disposed intermediate the member 70 and the cylinder sidewall 36 and the edge 94' of washer 90' being disposed intermediate the disc 72 and the cylinder inner sidewall 36.

Referring now to FIG. 6, therein illustrated is a pull-type dashpot H employing a resiliently flexible cup washer 100 and a substantially rigid back-up member 102 (the latter being illustrated separately in FIG. 9.) The piston means C of dashpot H is essentially identical to that of dashpot G of FIG. 5, except that the cup washers 90, 90' and the disc 72 are replaced by the cup washer 100 and back-up member 102 respectively. Unlike the cup washers 90, 90' of dashpots E, F and G which extend over the rounded peripheral edge of member 70 or disc 72 and longitudinally along the side thereof parallel to the cylinder axis for an appreciable distance (say, 1–2mms), the cup washer 100 of dashpot H extends over the rounded peripheral edge of member 70, but barely beyond. During the pull stroke of dashpot H the resiliently flexible edge 104 of the cup washer 100 is intimately contacting the cylinder inner sidewall 36 and creating an effective fluid-tight seal therebetween against the developing vacuum in chamber 84. However, on the push stroke the developing pressure in chamber 84 causes the cup washer edge 104 to retreat inwardly and rearwardly to conform closely to the adjacent surface of the member 70, thus creating a gap intermediate the edge 104 and the cylinder inner sidewall 36 through which fluid can pass to relieve the developing pressure. To preclude the cup washer edge 104 from folding forwardly and over upon itself under the influence of a very high vacuum in chamber 84, a back-up member 102 is provided for the cup washer 100, the back-up member 102 having a serrated peripheral edge 106 positioned closely adjacent the cup washer edge 104 but spaced from the cylinder inner sidewall 36. The back-up member edge 106 is both rigid and serrated, the rigid fingers providing the support required to prevent the cup washer edge from going beyond its normal bellowed-out position and folding over upon itself, and the serration notches 108 permitting the atmospheric conditions one one side of the back-up member 102 to be easily communicated to the other side thereof—i.e., from the chamber 84 to the cup washer edge 104.

Referring now to FIG. 7, therein illustrated is a push-type dashpot I employing a cup washer 100 and a back-up member 102. The piston means C of dashpot I is identical with that of dashpot H of FIG. 6 except that the unit composed of the cup washer 100 and the back-up member 102 has been turned around 180° to face the front of the cylinder B (instead of the rear thereof) and a disc 110, similar to disc 72 of dashpots E, F and G of FIGS. 2–5 is disposed intermediate the flange of bolt head 75 and the forward surface of the cup washer 100.

Referring now to FIG. 8, therein illustrated is a two-way or push-pull dashpot J employing a pair of cup washers 100, 100' and a pair of back-up members 102, 102'. The cup washer 100 and the back-up member 102 are positioned in dashpot J the same as in dashpot H of FIG. 6 while the cup washer 100' and the back-up member 102' are positioned in dashpot J the same as in dashpot I of FIG. 7, with members 102, 102' being in back-to-back abutting relationship and a disc 110 being disposed intermediate the flange of bolt head 75 and the forward surface of the cup washer 100'.

In operation the cylinder B is mounted on a pair of trunions 21 passing through the bushings 23 of ears 18. The far end 54 of the piston rod D is connected to the reciprocating member, the motion of which is to be dampened. Assuming the reciprocating motion to include components along the direction of the double headed arrow 62, one or the other of the guide means outer surface 38 is caused to bear against an adjacent portion of the cylinder inner sidewall 36 so that the entire cylinder B pivots in the direction of the component force about trunions 21. Assuming the reciprocating motion to include components along the direction of double headed arrow 60, the piston means C will pivot slightly within cylinder B, the degree of pivotal movement being limited by the guide means outer surfaces 38 to a level which does not impair functioning of the fluid blocking means—i.e., permits the washer edges 94, 94', 104, 104' (as applicable) to remain in fluid blocking contact with the cylinder inner sidewall 36. Obviously where the reciprocal motion includes components along the directions of both double headed arrows 60 and 62, the compensatory motions of the cylinder B and of the piston means within the cylinder both occur. In order to obtain the full beneficial effect of the present invention, it is of course necessary that the axis 40 connecting the guide means 34 be at right angles to the axis 22 passing through the ears 18, although partial benefits can be obtained even when the axes 22, 40 are not perpendicular.

Thus it is seen that while the construction of the piston 30 and the fluid blocking means will vary considerably depending upon whether or not a flap valve dashpot such as dashpots A–C or a cup washer/back-up member dashpot such as dashpots D–F are employed, the structure and functioning of the guide means 32 remain essentially the same in all instances. The resultant dashpots A–F are capable of forgiving a limited misalignment of the axis of the cylinder B and the axis of the reciprocating member, yet use a rigid connection between the piston means C and piston rod D and thus avoid the increased manufacturing costs and limitations on free movement inherent in non-rigid piston piston rod connection. Furthermore, the dashpots are of simple construction, easy to manufacture and of suitable longevity. Indeed, essentially the same components are used in many of the various embodiments shown and described above to illustrate the principles of the present invention. Even further standardization of the parts is, of course, possible. For example, in FIG. 5 the member 70 and the disc 72 may define apertures 80 so long as at least one of the cup washers 90, 90' does not contain corresponding apertures and thus blocks the travel path of fluid through apertures 80.

Now that the preferred embodiments of the present invention have been shown and described in detail, various modifications and improvements thereon will become readily apparent to those skilled in the art. Accordingly the spirit and scope of the present invention is to be limited only by the appended claims and not by the foregoing disclosure.

I claim:
1. A dashpot comprising
   A. a hollow cylinder substantially closed at one end thereof;
   B. piston means comprising
      i. a piston disposed in and slidable along said cylinder, said piston having an outer sidewall spaced inwardly from the inner sidewall of said cylinder;
      ii. fluid blocking means secured to said piston for movement therewith and having a flexible portion thereof disposed intermediate opposed sidewall portions of said piston and said cylinder respectively and effective to block passage of fluid therebetween; said piston and said fluid blocking means as a unit by themselves being configured and dimensioned for appreciable pivotal movement within said cylinder about axes transverse to said cylinder axis; and
      iii. at least one pair of guide means disposed on said piston for movement therewith, each guide means of said guide pair having an outer surface closely adjacent said cylinder inner sidewall, substantially circumferentially spaced from the outer surface of the other guide means of said guide pair, and configured and dimensioned to essentially preclude movement of a first magnitude of said piston means within said cylinder along a first axis substantially connecting said guide means of said guide pair while only limiting to a predetermined level movement of a second magnitude appreciably greater than said first magnitude of said piston means within said cylinder about a second axis parallel to said first axis; and
   C. a piston rod having a first end portion operatively connected to said piston for moving said piston and a second end portion adapted for connection with a member undergoing reciprocating motion along a path substantially, but not necessarily exactly, aligned with the axis of said cylinder;
whereby said guide pair insures the effective blocking function of said blocking means by essentially precluding motion of said piston means within said cylinder along said first axis while limiting to an acceptable level motion of said piston means within said cylinder about said second axis in response to limited misalignment of the axis of said cylinder and the axis of said piston rod.

2. The dashpot of claim 1 wherein said guide means of said guide pair are diametrically opposed.

3. The dashpot of claim 1 wherein there is only one of said guide pairs.

4. The dashpot of claim 1 wherein said piston means additionally includes at least one passage extending therethrough and at least one flap valve controlling the passage of fluid through said piston means passage.

5. The dashpot of claim 1 wherein said fluid blocking means comprises at least one resiliently flexible cup washer having an edge disposed intermediate opposed sidewall surface portions of said piston and said cylinder.

6. The dashpot of claim 5 wherein said cup washer edge is movable between first and second positions, said cup washer edge in said first position blocking the passage of fluid thereby intermediate said cylinder and said piston and in said second position permitting the passage of fluid thereby intermediate said cylinder and said piston, said cup washer edge assuming said first position upon movement of said piston in a first direction and assuming said second position upon movement of said piston in a second direction opposed to said first direction.

7. The dashpot of claim 6 additionally including at least one substantially rigid back-up member secured to said piston for movement therewith and disposed adjacent said cup washer edge to limit movement of said cup washer edge from said first position to a position beyond said second position.

8. The dashpot of claim 1 wherein said guide means outer surfaces are of self-lubricating material.

9. The dashpot of claim 1 additionally including means for pivotally mounting said cylinder on a supporting structure to enable pivotal movement of said cylinder relative to the supporting structure about an axis transverse to said cylinder axis and said first axis, whereby said cylinder is able to track said piston.

10. The dashpot of claim 1 wherein said guide pair and at least a portion of said piston are of one-piece integral construction.

11. The dashpot of claim 1 wherein said guide means outer surfaces are configured and dimensioned to limit to less than about 5° the movement of said piston means within said cylinder about said second axis.

12. The dashpot of claim 1 wherein each of said guide means comprises an extension of a segment of said piston outer sidewall in a longitudinal direction and a thin strip of self-lubricating material secured to the outer surface thereof to define said guide means outer surface.

13. The dashpot of claim 1 wherein, in the absence of said cylinder, said fluid blocking means extends outwardly beyond said guide means.

14. The dashpot of claim 1 wherein said cylinder is substantially open at the other end thereof.

* * * * *